(12) United States Patent
Richter et al.

(10) Patent No.: US 8,599,674 B2
(45) Date of Patent: Dec. 3, 2013

(54) METHOD FOR STORING DATA ON AN OPTICAL RECORDING MEDIUM

(75) Inventors: Hartmut Richter, Villingen-Schwenningen (DE); Holger Hofmann, Thousand Oaks, CA (US); Stephan Knappmann, Zimmern (DE); Christof Ballweg, Villingen-Schwenningen (DE); Christian Büchler, Villingen-Schwenningen (DE)

(73) Assignee: Thomson Licensing, Boulogne, Billancourt (FR)

( * ) Notice: Subject to any disclaimer, the term of this patent is extended or adjusted under 35 U.S.C. 154(b) by 1629 days.

(21) Appl. No.: 10/535,117

(22) PCT Filed: Nov. 3, 2003

(86) PCT No.: PCT/EP03/12256
§ 371 (c)(1),
(2), (4) Date: May 16, 2005

(87) PCT Pub. No.: WO2004/047089
PCT Pub. Date: Jun. 3, 2004

(65) Prior Publication Data
US 2006/0072396 A1 Apr. 6, 2006

(30) Foreign Application Priority Data
Nov. 15, 2002 (EP) .................................... 02025756

(51) Int. Cl.
*G11B 7/24* (2013.01)

(52) U.S. Cl.
USPC ...................................... 369/275.1

(58) Field of Classification Search
USPC ....................................... 369/59.23
See application file for complete search history.

(56) References Cited

U.S. PATENT DOCUMENTS

| | | | | |
|---|---|---|---|---|
| 4,410,877 A | * | 10/1983 | Carasso et al. | 341/51 |
| 4,414,659 A | * | 11/1983 | Beckers | 369/59.24 |
| 4,617,553 A | * | 10/1986 | Webster et al. | 341/58 |
| 4,907,216 A | * | 3/1990 | Rijnsburger | 369/44.39 |

(Continued)

FOREIGN PATENT DOCUMENTS

| | | |
|---|---|---|
| EP | 299573 | 1/1989 |
| EP | 0703576 | 3/1996 |

(Continued)

OTHER PUBLICATIONS

Search Report Dated May 12, 2004.

*Primary Examiner* — Joseph Feild
*Assistant Examiner* — Henok Heyi
(74) *Attorney, Agent, or Firm* — Jeffrey D. Carter

(57) ABSTRACT

The invention relates to a method for storing data in a prerecorded area of an optical recording medium, and to an optical recording medium having at least one prerecorded area in which data is stored according to the method. It is an object to propose a method for storing data in a prerecorded area of an optical recording medium using pits and lands, whereby the signal obtained from the pits and lands is compatible with a high frequency modulated groove signal. According to the invention, the pits and lands adjacent to bit cell signal transitions are arranged in a predefined manner, either in a fixed recurring sequence of pits and lands or symmetrically to the bit cell signal transitions.

16 Claims, 5 Drawing Sheets

(56) References Cited

U.S. PATENT DOCUMENTS

| | | | |
|---|---|---|---|
| 4,977,553 A | | 12/1990 | Yokogawa |
| 5,327,299 A | * | 7/1994 | Nishikawa et al. ............ 360/48 |
| 5,513,161 A | * | 4/1996 | Horimai et al. ............ 369/53.31 |
| 5,563,872 A | * | 10/1996 | Horimai .................... 369/275.4 |
| 5,608,711 A | * | 3/1997 | Browne et al. ................ 369/116 |
| 5,608,712 A | * | 3/1997 | Rilum et al. .................. 369/116 |
| 5,623,478 A | * | 4/1997 | Horimai .................... 369/53.35 |
| 5,706,268 A | * | 1/1998 | Horimai .................... 369/59.12 |
| 5,892,752 A | * | 4/1999 | Matsuura .................. 369/275.4 |
| 5,920,272 A | * | 7/1999 | Schouhamer Immink ..... 341/59 |
| 6,108,296 A | * | 8/2000 | Kajiyama et al. .......... 369/275.4 |
| 6,256,276 B1 | * | 7/2001 | Kobayashi et al. ........ 369/47.31 |
| 6,430,142 B2 | * | 8/2002 | Miyamoto et al. ....... 369/124.07 |
| 6,853,615 B1 | * | 2/2005 | Spruit et al. ............... 369/275.4 |
| 2002/0051411 A1 | * | 5/2002 | Asakura .................... 369/44.28 |
| 2004/0120247 A1 | * | 6/2004 | Lee et al. ................... 369/275.3 |

FOREIGN PATENT DOCUMENTS

| | | |
|---|---|---|
| EP | 0723216 | 7/1996 |
| EP | 1168312 | 1/2002 |
| JP | 09081938 | 3/1997 |
| WO | WO 02/25645 | 3/2002 |
| WO | WO 03/094158 | 11/2003 |

* cited by examiner

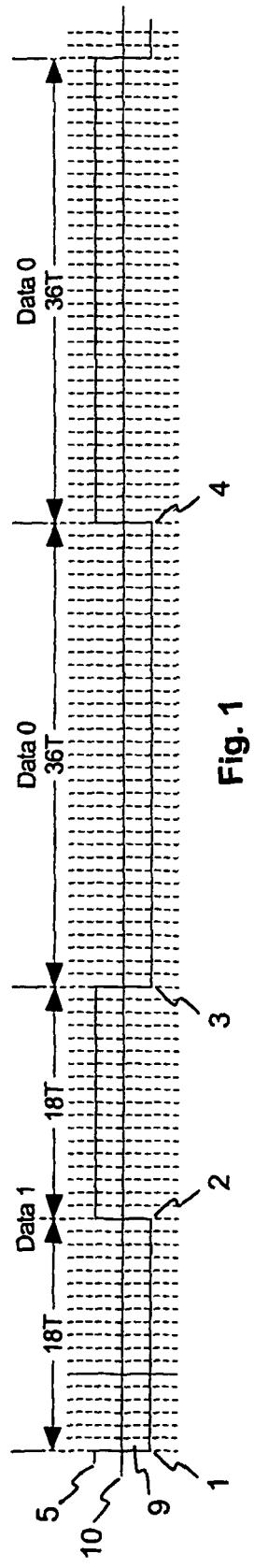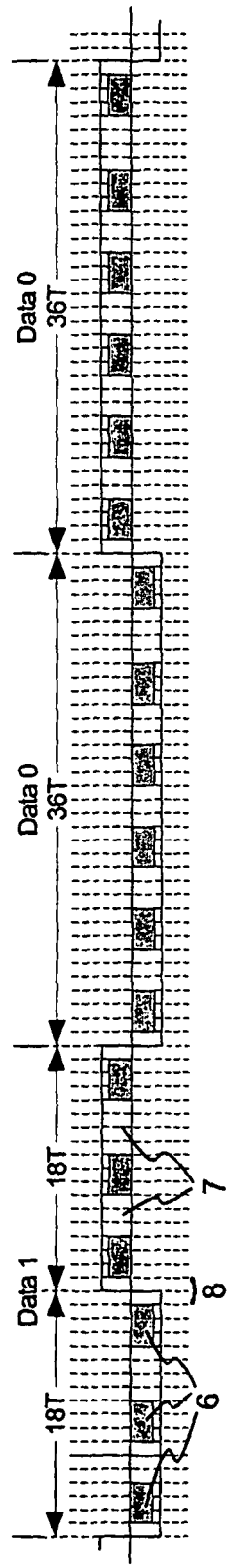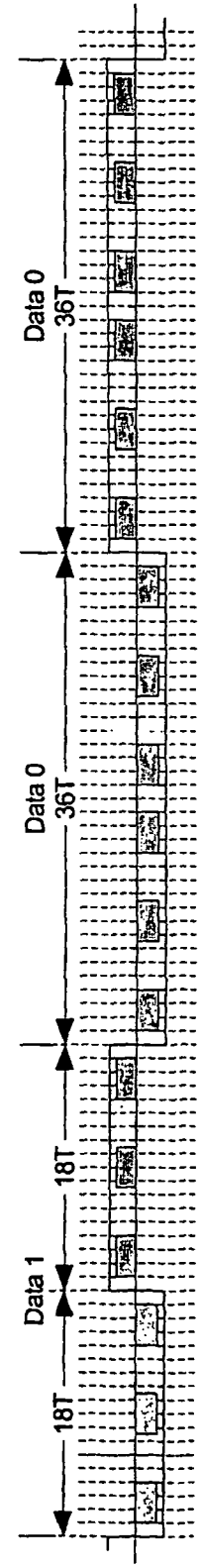

METHOD FOR STORING DATA ON AN OPTICAL RECORDING MEDIUM

This application claims the benefit, under 35 U.S.C. §365 of International Application PCT/EP03/12256, filed Nov. 3, 2003, which was published in accordance with PCT Article 21(2) on Jun. 3, 2004 in English and which claims the benefit of European patent application No. 02025756.4, filed Nov. 15, 2002.

The present invention relates to a method for storing data in a prerecorded area of an optical recording medium, and to an optical recording medium having at least one prerecorded area in which data is stored according to the method.

In general, in optical recording media which are in the form of discs and are suitable for reading and/or writing, embossed tracks are formed such that they represent an interleaved spiral or concentric circles. Along the tracks, data is stored in form of pits and lands (also referred to as marks and spaces). An apparatus for reading from and/or writing to optical recording media comprises an optical pickup, which has to exactly follow the tracks for the reading and/or writing operation. For this purpose, a low frequency tracking error signal is obtained, for example by push pull tracking, which uses the interference patterns caused by a groove structure of the disc, or by differential phase detection, which uses the interference patterns caused by the pits, or by other types of tracking, which are well known in the art.

For optical recording media it is desirable to have one or more prerecorded areas containing data for various purposes in addition to the main data area containing the user data, e.g. software or video data. These prerecorded areas can, for example, contain data describing the physical properties of the disc suitable for adjusting the reading and/or recording parameters, information about copy protection or other auxiliary information. They are generally not used for storing user data.

In case of recent high-density rewritable optical recording media, information is stored in the prerecorded area using a modulated continuous groove, i.e. a groove rapidly meandering with respect to the track center. Using the push pull effect a tracking error like signal can be obtained, referred to as radial information channel or modulation signal 5, which represents the information stored in the groove. The modulation signal 5 can be converted back into data bits by applying a biphase modulation as shown in FIG. 1. A bit cell representing a digital '0' is characterized by a transition at the start and at the end of the bit cell. A bit cell representing a digital '1' is characterized by a transition at the start, at the end and in the middle of the bit cell. Each bit cell has the same length. The bandwidth of this signal can be much higher than that used for the actual tracking error signal.

Contrary to the recent high-density rewritable optical recording medium, for a recent high density read-only recording medium it has been proposed to use a row of pits and lands instead of a continuous wobbled groove to store the data. The reason for this is that during production of the read-only recording medium both pits (for user data) and a continuous wobbled groove (for additional prerecorded information) have to be produced within one disc, which increases production costs. According to the proposal, pits placed laterally distanced from the track center are used for generating a track error like signal which is compatible, from the point of view of detection, with the modulated groove signal. The track error like signal has a much higher frequency than the actual track error signal. Apart from storing additional information, the laterally displaced pits can also be used as a copy protection mechanism, since it will be difficult to copy the pits to another recording medium. Unfortunately, the position of the pits is not symmetric to the bit cell signal transitions, i.e. the position where the row of pits changes from one side of the track center to the other side of the track center. Due to this asymmetry a transition of the detected signal does not correspond to the precise start or end of a bit cell, which leads to an increased jitter in the modulation signal.

A recording medium of a similar type is disclosed, for example, in the European Patent Application EP 0 703 576. The recording medium comprises regular and unusual pit trains. The presence of unusual pit trains serves as an indication that the recording medium is a legitimate copy. However, no additional information as in the prerecorded areas is stored in the unusual pit trains.

In conclusion, it is an object of the present invention to propose a method for storing data in a prerecorded area of an optical recording medium using pits and lands, whereby the signal obtained from the pits and lands can be compatible with the high frequency modulated groove signal.

This object is achieved by a method for storing data as bit cells in a prerecorded area of an optical recording medium using pits and lands, the pits and lands being placed out of the center of a track of the prerecorded area, whereby the pits and lands adjacent to bit cell signal transitions are arranged in a predefined manner. This has the advantage that it is possible to exactly define the position of the pits and lands adjacent to the bit cell signal transitions so that the modulation signal transition corresponds to or at least has a fixed relation to the precise start or end of the bit cell. Furthermore, this allows to optimize the pits and lands for the specific type of radial information channel, i.e. push pull or differential phase detection. Of course, other types of radial information channels can also be taken into account.

The invention makes it possible to arrange the laterally displaced pits and lands in the prerecorded area in a way which allows to generate a detectable signal waveform from the pits using the radial information channel which represents the prerecorded data. In addition, the invention allows to take both the push pull and the differential phase detection effect into account. Since the tracking systems used for high-density optical recording media usually rely on either of the effects, a highly reliable signal detection is assured. Though the invention has so far been described for biphase modulated information stored in the prerecorded areas, the invention is also applicable to other modulation schemes. In addition, it is likewise possible to make use of the invention in recording areas of an optical recording medium.

Favorably, the method comprises the step of arranging the pits and lands in a fixed recurring sequence of pit lengths and land lengths at the bit cell signal transitions. In this case the modulation signal transitions in the radial information channel are all moved in the same way. This can be understood as follows. Depending on the length and the position of a first pit directly preceding and a second pit directly following the transition, the detected signal shape varies. That means that a detected event, e.g. a zero point or zero crossing of the signal relative to a long time mean value of the signal is detected at different points in time for different types of preceding pits. The detected event seems to be moved or shifted away from its originally expected position. By assuring that the pit structure is the same for all bit cell signal transitions, this shift is the same for all detected events. Therefore, the jitter in the modulation signal caused by varying positions of the modulation signal transitions relative to the bit cell signal transitions is reduced.

Advantageously, the method comprises the step of arranging the pits adjacent to the bit cell signal transitions symmetrically to the bit cell signal transitions. This guarantees that the modulation signal transitions correspond exactly to the bit cell signal transitions. In this way it is also ensured that the modulation signal is free from jitter.

As a refinement of the above symmetrical arrangement of the pits, the method further comprises the step of also arranging symmetrically the lands adjacent to the pits which are arranged symmetrically to the bit cell signal transitions. This can be done since only the bit cell signal transitions are relevant. In this way an improved intersymbol interference (ISI) is achieved, which improves the signal detection quality.

According to a further aspect of the invention an identical number of pits and lands is placed in each bit cell. If the sum signal of the detector used for obtaining the radial information channel carries an information code within the prerecorded area, typically the digital sum value (DSV) of the code, i.e. the average occurrence of pits and lands, should not differ from zero. This is achieved by placing an identical number of pits and land in each bit cell.

It is further advantageous to set the lengths of the symbols, i.e. the pits and lands, to integer multiples of a predefined length based on a nominal channel clock and a nominal rotational speed of the recording medium. This makes it possible to store additional information in the pit structure, e.g. a key used for encryption of the content of the recording medium, which can be obtained from the sum signal of the detector used for obtaining the radial information channel.

Favorably a gap is inserted between the pits at the bit cell signal transitions. This ensures that a compensation of the modulation signal generating effect is avoided. Such effect could occur if no gap was provided or if there was an overlap of the pits.

According to one aspect of the invention the method comprises the step of arranging pits, which are long compared with the diameter of a readout spot used for detecting the pits, e.g. pits corresponding to 5T, near the bit cell signal transitions. This is especially advantageous if a push pull type radial information channel is used, since it allows to achieve steep modulation signal transitions at the bit cell signal transitions.

Favorably, the method further comprises the step of arranging lands, which are short compared with the diameter of the readout spot, within the bit cell. This avoids a drop of the push pull signal and a strong modulation of the radial information channel signal within the bit cell. In this way the waveform keeps a certain safety distance from zero.

According to another aspect of the invention, the method comprises the step of arranging pits with a length corresponding to the full width at half maximum of the intensity distribution of the readout spot near the bit cell signal transitions. This arrangement is advantageous for a differential phase detection type radial information channel and allows to achieve steep modulation signal transitions at the bit cell signal transitions, since the differential phase detection based amplitude is larger if there are more signal transitions Advantageously, the method further comprises the step of arranging pits, which are short compared with the diameter of the readout spot, within the bit cell. This avoids a drop of the differential phase detection signal and a strong modulation of the radial information channel signal within the bit cell. In this way the waveform keeps a certain safety distance from zero.

Favorably, the method comprises the step of varying the distance between the track center and the pits and lands, e.g. by reducing the distance between the pits and the track center close to the bit cell signal transitions. In this way it is possible to achieve an optimized detection amplitude within the bit cell by holding the peak values of the detected signal at a predefined level. The optimum variation of the distance might be different for push pull and differential phase detection.

Furthermore, it is likewise advantageous to vary the width of the pits, e.g. by increasing the width of the pits close to the bit cell signal transitions. This also allows to achieve an optimized detection amplitude within the bit cell by holding the peak values of the detected signal at a predefined level. The optimum variation of the pit width might be different for push pull and differential phase detection.

Advantageously, the average of a modulation signal containing the stored data is zero for bit cells representing a digital '1' and zero for two consecutive bit cells representing a digital '0'. If the individual signals used for generating the differential phase detection signal are binarized using a data slicer, this keeps the average of the decision level of the data slicer around zero even when the digital sum value is allowed to be different from zero.

According to a further aspect of the invention, an optical recording medium comprises at least one prerecorded area in which data is stored according to a method according to the invention. Such a recording medium is easy to produce and has, therefore, reduced production costs. The optical recording medium preferably is a read-only medium, however, the invention can also be advantageously applied to a recordable medium.

Favorably an apparatus for reading from optical recording media comprises means for retrieving data stored in at least one prerecorded area of an optical recording medium according to the inventive method. Such an apparatus is capable of extracting the information stored in the prerecorded area.

According to the invention, an apparatus for writing to optical recording media comprises means for writing data to is optical recording media according to the inventive method. Such an apparatus is advantageous in that it allows to store data in the prerecorded area of an optical recording medium, e.g. during production of the medium. Such an apparatus can be used, for example, during production of the optical recording media.

For a better understanding of the invention, exemplary embodiments are specified in the following description of advantageous configurations with reference to the figures. It is understood that the invention is not limited to these exemplary embodiments and that specified features can also expediently be combined and/or modified without departing from the scope of the present invention. In the figures:

FIG. 1 shows biphase modulation in a prerecorded area of an optical recording medium;

FIG. 2 shows a prerecorded area having pits and lands arranged in a pit structure according to the invention;

FIG. 3 shows a pit structure having an identical number of pits and lands in each bit cell;

Figure 4:
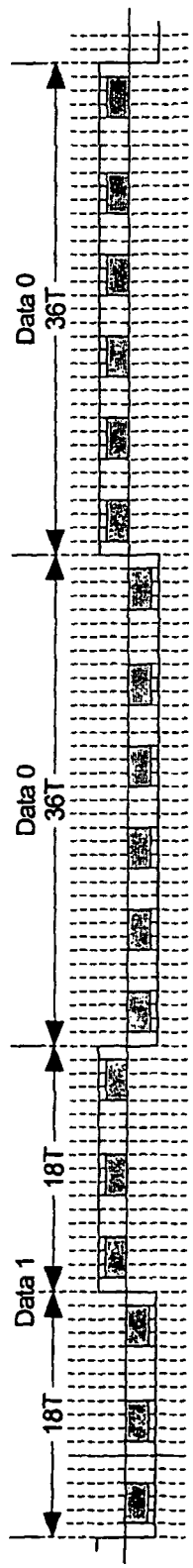
FIG. 4 shows pits and lands in a prerecorded area having their lengths set to integer multiples of a predefined length.

FIG. 1 shows biphase modulation in a prerecorded area of an optical recording medium having a continuous high frequency modulated groove 9 wobbled with respect to a track center 10. A bit cell representing a digital '0' is characterized by a first transition 3 at the start and a second transition 4 the end of the bit cell. A bit cell representing a digital '1' is characterized by a first transition 1 at the start, a second transition 3 at the end and a third transition 2 in the middle of the bit cell. Each bit cell has the same length, which is an integer multiple of a predefined length that is calculated from a nominal channel clock T and a nominal rotational speed of the recording medium. Of course, other modulation schemes can also be used.

The signal 5 representing the modulation, which is schematically depicted in the figure, can be obtained by detecting with a detector a tracking error like signal, referred to as radial information channel, which is generated using the push pull signal or the differential phase detection signal. The frequency of this signal can be much higher than that used for the actual tracking error signal.

In FIG. 2 an example of a prerecorded area using pits 6 and lands 7, which are arranged in a pit structure according to the invention, is shown. Using the push pull effect the special pit structure generates the expected modulation waveform, which represents the information data bits in the radial information channel. As can be seen from the figure, the pits 6 and lands 7 are placed laterally out of the track center 10. In addition, the sequence of pits 6 and lands 7 adjacent to the bit cell signal transitions 1, 2, 3, 4 is the same predefined sequence for all bit cell signal transitions 1, 2, 3, 4, namely 4T land, 3T pit, 2T land, 3T pit, 3T land. Apart from generating the radial information channel, the pits 6 and lands 7 can also carry information in themselves, if an additional coding scheme is applied which modulates the physical length of the pits 6 according to further data (not shown in the figure). The distance between the pits 6 and the track center 10 is exaggerated in the figures for the sake of clarity. Generally the displacement is much smaller, i.e. the pits 6 still partly overlap with the track center 10.

Independent of the type of the radial information channel, i.e. differential phase detection or push pull or other types, some common features and combinations thereof are advantageous for the detection of the modulated data:

1.) The pits 6 are placed out of the track center 10 line.

2.) If, in addition to the radial information channel, the sum signal of the detector carries an information code within the prerecorded area:
a) typically, the digital sum value (DSV), i.e. the average occurrence of pits 6 and lands 7 of the code, should not differ from zero. This is achieved by placing an identical number of pits 6 and lands 7 in each bit cell. An example of such a pit structure with DSV=0, i.e. having an identical number of pits 6 and lands 7 in each bit cell, is shown in FIG. 3.
b) all symbols (pits 6 or lands 7) need to have a length of an integer multiple of the channel clock period T. This can be fulfilled if both pits 6 and lands 7 have a physical length of an integer multiple of a predefined length which is based on the nominal channel clock T and the nominal rotational speed of the optical recording medium. Such a pit structure based on T intervals with DSV=0 is depicted in FIG. 4.

If, however, the sum signal of the detector does not carry an information code in the prerecorded area:
a) the digital sum value of the code can differ from zero and/or
b) the symbols (pits 6 or lands 7) do not need to have a length of an integer multiple of the channel clock period T.

Figure 5:
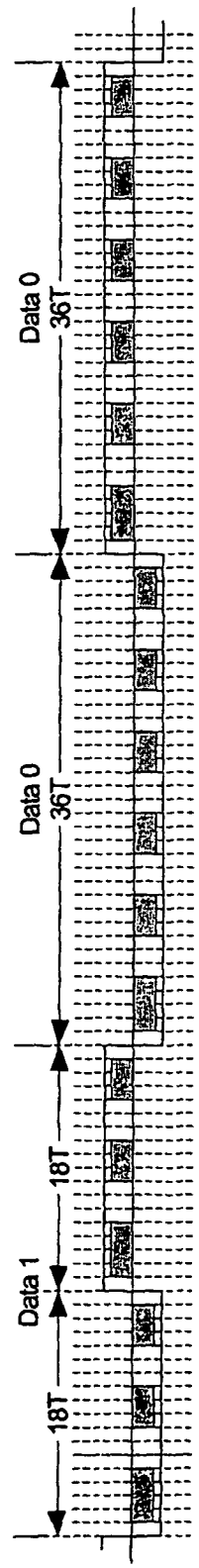
FIG. 5 shows a pit structure where the pits and lands are arranged in a fixed recurring sequence adjacent to signal transitions.
Figure 6:
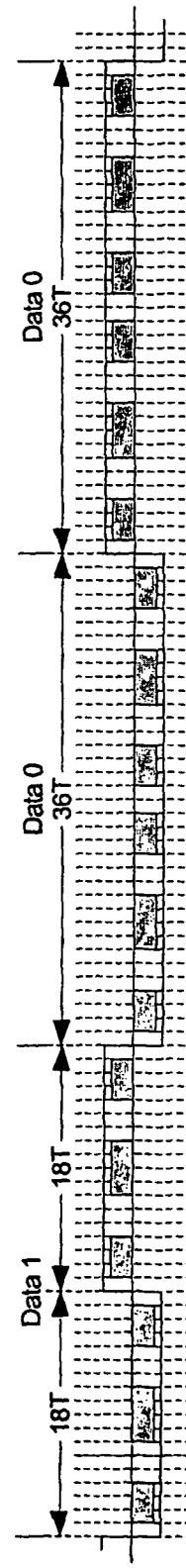
FIG. 6 shows a pit structure where the pits are placed symmetrically to the signal transitions.

3.) The signal jitter of the bit cell signal transitions 1, 2, 3, 4 used within the modulation can be minimized by placing the pits 6 next to the bit cell border in a predefined manner:
a) the pits 6 are arranged in a fixed recurring pit/land length sequence at bit cell signal transitions 1, 2, 3, 4. Then the modulation signal transitions in the radial information channel are all moved in the same way. A corresponding pit structure is shown in FIG. 5, namely 3T land, 3T pit, 2T land, 4T pit, 3T land.
b) the pits 6 are placed in a symmetrical position around the bit cell signal transition. Consequently, the modulation signal transitions in the radial information channel are not moved.
c) if not only the pits 6 next to the bit cell signal transitions 1, 2, 3, 4 are placed in a symmetrical way, but also the adjacent lands 7, an improved intersymbol interference (ISI) can be achieved, which improves the signal detection quality. FIG. 6 shows such a pit structure where the pits 6 and the adjacent lands 7 are placed symmetrically to the signal transitions, namely 3T land, 3T pit, 2T land, 3T pit, 3T land. The pit structure has an improved intersymbol interference.

4.) At bit cell signal transitions 1, 2, 3, 4 a gap 8 between the pits 6 avoids a compensation of the modulation signal generating effect, which could occur if no gap 8 was provided or if there was an overlap of the pits 6. This gap 8 is also found in the pit structure depicted in FIG. 6

Figure 7:
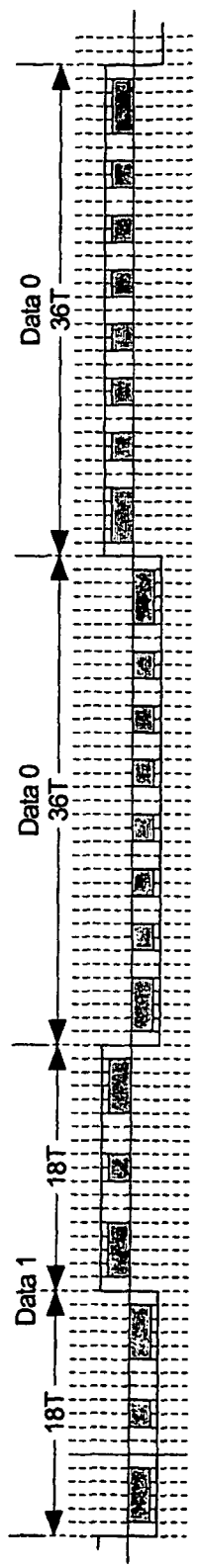
FIG. 7 shows a pit structure where the pits near to the signal transitions are long compared with the diameter of a readout spot.

Depending on the type of radial information channel, i.e. differential phase detection or push pull, some parameters can additionally be optimized. If the pits 6 are to be detected by both tracking systems, a compromise needs to be found for the following parameters:

Push pull type radial information channel:

1.) To achieve steep modulation signal transitions at the bit cell signal transitions 1, 2, 3, 4, the pits 6 used near the bit cell signal transitions 1, 2, 3, 4 should be long compared to the diameter of the readout spot used for detecting the pits 6. A corresponding pit structure is shown in FIG. 7.

Figure 8:
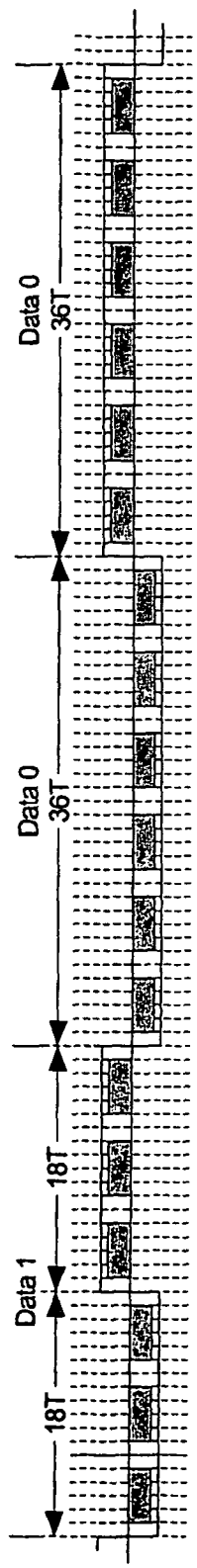
FIG. 8 shows a prerecorded area having short lands within the bit cells.

2.) The lands 7 used within the bit cell should be short compared to the diameter of the readout spot to avoid a drop of the generated signal, as is the case for the pit structure depicted in FIG. 8. The aim of the optimization is to avoid a strong modulation of the radial information channel signal within the bit cell. The waveform should keep a certain safety distance from zero.

Figure 9:
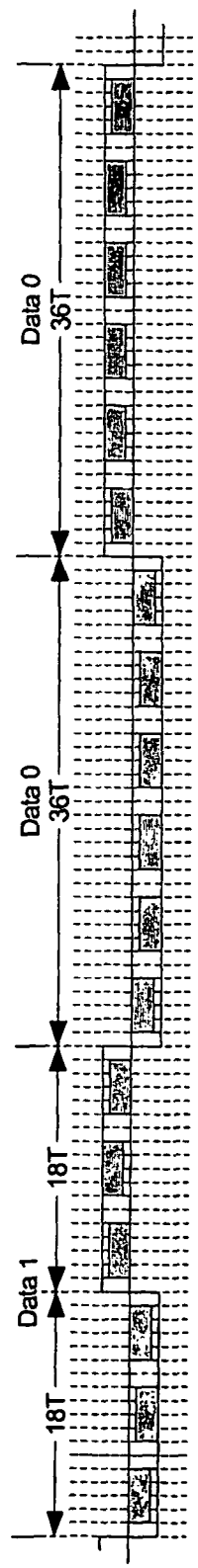
FIG. 9 shows variation of the distance between the track center and the pits and lands.

3.) To achieve an optimized detection amplitude within the bit cell:
a) the distance between the track center 10 and the pits 6 and lands 7 can be kept constant within the bit cell. The value of the distance itself can be optimized to create a large detection amplitude and thus an improved signal to noise ratio.
b) the distance between the track center 10 and the pits 6 and lands 7 can also be varied within the bit cell to improve the detected waveform. A corresponding pit structure is shown in FIG. 9. The aim is to hold the peak values of the detected signal at a predefined level.

Figure 10:
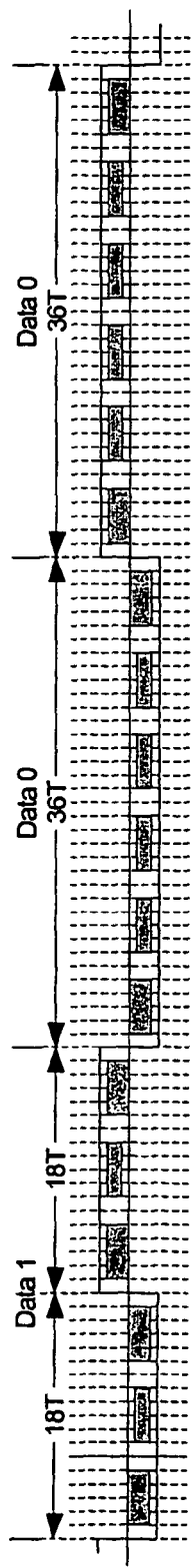
FIG. 10 shows variation of the width of the pits inside the bit cells.

4.) To achieve an optimized detection amplitude, it is also possible to vary the pit width as shown in FIG. 10 to optimize the detected waveform. Again the aim is to hold the peak values of the detected signal at a predefined level. The optimum width of the pits 6 might be different for push pull and differential phase detection.

5.) To keep the average of the decision level for a binarization of the radial information channel around zero, the number of pits 6 being situated on one side of the track center 10 and the number of pits 6 being situated on the other side of the track center 10 should be equal. This is automatically guaranteed when a biphase modulation is applied. However, for other modulation schemes this might not be the case. When biphase modulation is used, the digital sum value of the code can differ from zero.

Differential phase detection type of radial information channel:

1.) The differential phase detection based amplitude is larger if there are more signal transitions, i.e. shorter pits 6 or lands 7 create more data transitions.

To achieve steep signal transitions, the pits 6 near the bit cell signal transitions 1, 2, 3, 4 should be short compared to the diameter of the readout spot. An optimum is reached when the pit length is about the same as the full width at half maximum of the intensity distribution of the readout spot.

Figure 11:
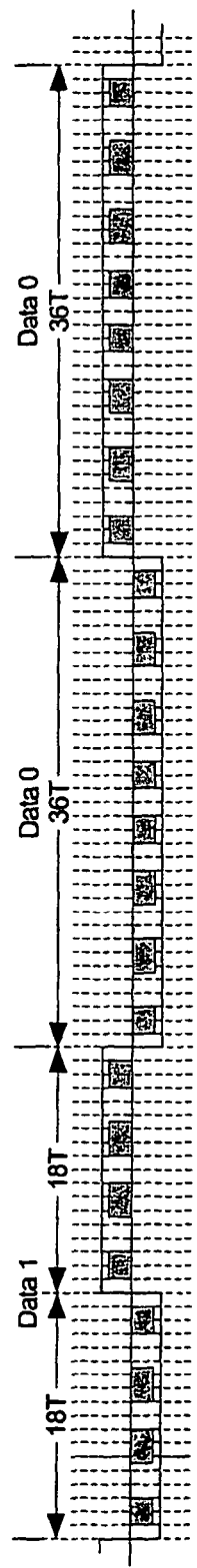
FIG. 11 shows a prerecorded area having short pits and lands arranged in the bit cells.

2.) The pits 6 used within the bit cell should also be short compared to the diameter of the readout spot to avoid a drop of the differential phase detection signal. The aim of the optimization is to avoid a strong modulation of the radial information channel signal within the bit cell. The waveform should keep a certain safety distance from zero. An example of a pit structure using short pits 6 and lands 7 next to the cell border and within the cell is shown in FIG. 11.

3.) To achieve an optimized detection amplitude within the bit cell:
a) the distance between the track center 10 and the pits 6 and lands 7 can be kept constant within the bit cell. The value of the distance itself can be optimized to create a large detection amplitude and an improved signal to noise ratio of the differential phase detection signal.
b) the distance between the track center 10 and the pits 6 and lands 7 can also be varied within the bit cell to improve the detected waveform. The aim is to hold the peak values of the detected signal at a predefined level.

Figure 12:
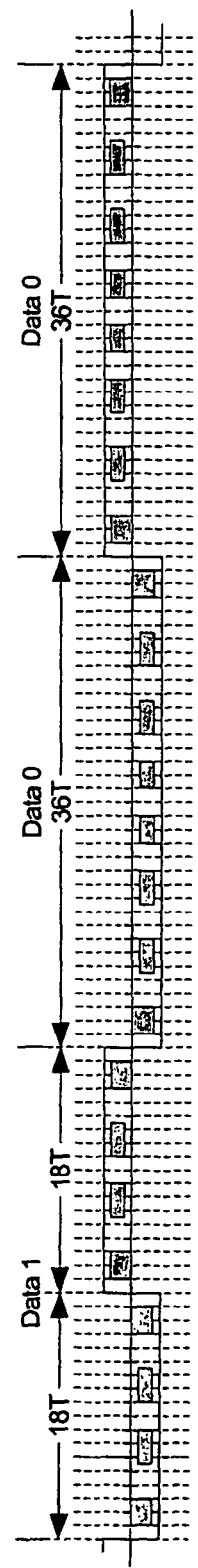
FIG. 12 shows variation of the pit width for a pit structure as in FIG. 11.

4.) To achieve an optimized detection amplitude, it is also possible to vary the pit width as shown in FIG. 12 to optimize the detected waveform. Again the aim is to hold the peak values of the detected signal at a predefined level. The optimum width of the pits 6 might be different for push pull and differential phase detection.

Figure 13:
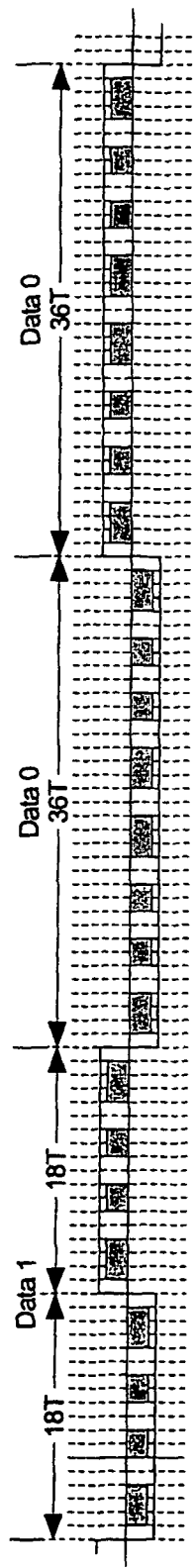
FIG. 13 shows a pit structure suitable for differential phase detection using a data slicer.

5.) If the individual signals used for generating the differential phase detection signal are binarized using a data slicer:
a) the digital sum value of the code should not differ from zero. This can be achieved by placing an identical number of pits 6 and lands 7 in each bit cell.
b) when using a biphase modulation, the digital sum value is allowed to be different from zero if the average of the radial information channel signal is zero within biphase bit cells representing a digital '1', and if it is zero within two consecutive bit cells representing a digital '0'. This keeps the average of the decision level of the data slicer around zero. A corresponding pit structure is depicted in FIG. 13.

The invention claimed is:

1. A method for storing data as bit cells in a prerecorded data area of an optical recording medium using pits and lands, wherein all pits and lands in a complete portion of the prerecorded data area are displaced relative to a center of a track, wherein the pits and lands repeatedly transition from one side of the track center to another side of the track center and bit cells are defined by transitions of the pits and lands from one side of the track center to another side of the track center, and wherein the method comprises a step of placing pits and lands with an identical fixed sequence of it lengths and land lengths at positions of all transitions defining the bit cells.

2. The method according to claim 1, wherein the pits are arranged symmetrically relative to the transitions defining the bit cells.

3. The method according to claim 2, further comprising a step of arranging the lands adjacent to the pits and symmetrically relative to the transitions defining the bit cells.

4. The method according to claim 1, further comprising a step of placing an identical number of pits and lands in each one of the bit cells.

5. The method according to claim 1, further comprising a step of setting lengths of the pits and lands to integer multiples of a predefined length based on a nominal channel clock and a nominal rotational speed of the optical recording medium.

6. The method according to claim 1, further comprising a step of inserting a gap at the transitions defining the bit cells.

7. The method according to claim 1, further comprising a step of arranging pits, which are long compared with a diameter of a readout spot, near the transitions defining the bit cells.

8. The method according to claim 7, further comprising a step of arranging lands, which are short compared with the diameter of a readout spot, distanced from the transitions defining the bit cells.

9. The method according to claim 7, further comprising a step of arranging lands, which are short compared with the diameter of the readout spot, distanced from the transitions defining the bit cells.

10. The method according to claim 9, further comprising a step of arranging pits, which are short compared with the diameter of a readout spot, distanced from the transitions defining the bit cells.

11. The method according to claim 1, further comprising a step of arranging pits with a length corresponding to a full width at half maximum of an intensity distribution of a readout spot near the transitions defining the bit cells.

12. The method according to claim 11, further comprising a step of arranging pits, which are short compared with the diameter of the readout spot, distanced from the transitions defining the bit cells.

13. The method according to claim 1, further comprising a step of varying a distance between the track center and the pits and lands.

14. The method according to claim 1, further comprising a step of varying a width of the pits.

15. The method according to claim 1, wherein an average of a modulation signal containing the stored data is zero for the bit cells representing a digital '1' and zero for two consecutive bit cells representing a digital '0'.

16. An optical recording medium, comprising:
at least one prerecorded data area in which data is stored as bit cells using pits and lands, wherein:
all the pits and lands in a complete portion of the prerecorded data area are displaced relative to a center of a track;
the pits and lands repeatedly transition from one side of the track center to another side of the track center and bit cells are defined by transitions of the pits and lands from one side of the track center to another side of the track center; and
pits and lands with an identical fixed sequence of it lengths and land lengths are placed at positions of all transitions defining the bit cells.

* * * * *